Nov. 23, 1965 J. ROSANES 3,218,839

STRUCTURAL ELEMENTS AND THE MANUFACTURE THEREOF

Filed Nov. 19, 1962 2 Sheets-Sheet 1

INVENTOR.
JACOB ROSANES
BY
ATTORNEYS

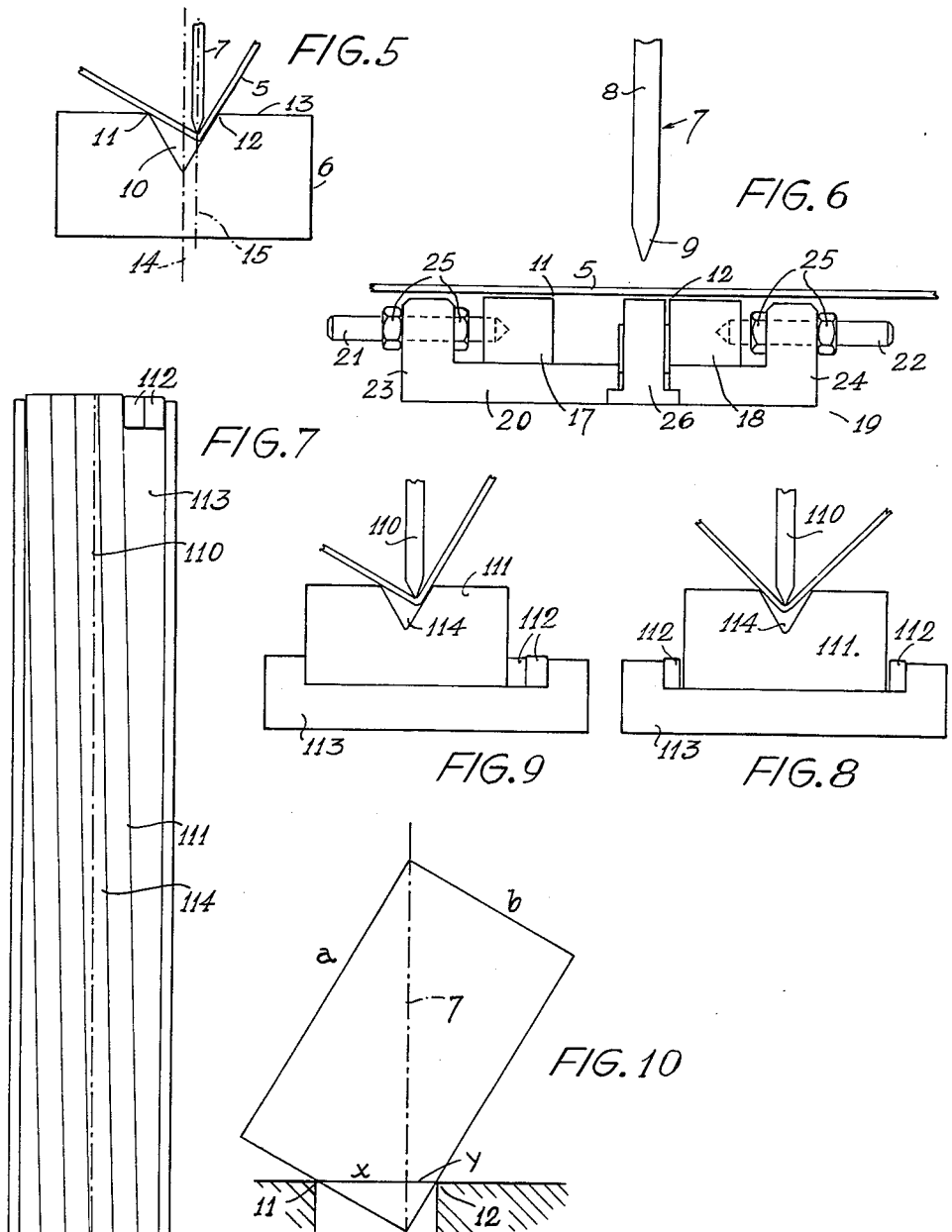

United States Patent Office
3,218,839
Patented Nov. 23, 1965

1

3,218,839
STRUCTURAL ELEMENTS AND THE
MANUFACTURE THEREOF
Jacob Rosanes, 31 Harakafot St., Kiryat Tivon, Israel
Filed Nov. 19, 1962, Ser. No. 238,628
Claims priority, application Great Britain, Nov. 25, 1961,
42,254/61
4 Claims. (Cl. 72—412)

This invention relates to hollow four-sided beams or columns from sheet metal. In my United States Patent No. 3,039,414, I have already described the manufacture of such beams. The said patent relates mainly to the maunfacture of tapering beams but I have stated there that the same or similar means may be used and the underlying idea of the invention may be applied in the manufacture of beams which are of rectangular cross section, though not necessarily of tapering shape.

It is the main object of the present invention to provide an improved process facilitating the manufacture of hollow beams from sheet metal.

For a better understanding of the problems arising in this field, I shall now refer in short to what has been stated in my said prior patent.

The rectangular tube as a structural element as such is considered an advantageous shape in comparison to other structural shapes when horizontal and vertical stresses, as applied normally in steel structures, are to be taken into consideration. When such tubes are manufactured by the conventional rolling, extruding or drawing, etc., methods, they are always of uniform cross sections and cannot be economically modified for tapering by additional fabrication. Furthermore the process of fabricating tapering tubes by welding appropriately sheared two channels or two angles (or any other combination thereof) is not economical either, and therefore has not been put to wider use.

In practice, in this latter technique two angles were prepared by bending from sufficiently strong sheet metal and were then welded together. Of course, angles were appropriately cut, each flange being (or at least one flange of each angle) of elongated trapezoidal shape. The bending of such an angle is conventionally performed in presses using a set of dies, the lower part of which has a pair of parallel forming edges, e.g. a V-groove, while the upper part is an elongated knife-like member, the edge of which enters the V-groove.

It was the object of the said patent to provide a method of producing hollow quadrangular box-type tapering or non-tapering beams of varying cross sections from sheet metal which, when used as structural elements, such as columns, beams, girders, purlins, etc., fulfill all the requirements for the erection of metal frame buildings such as factories, warehouses, railway- or bus-terminals or others.

In the above-described method of my U.S. Patent No. 3,039,414, a flat elongated sheet work piece was first bent about one outer line, and then about at least one other outer line. The sheet was then bent about an intermediate line by moving a knife member toward a die having a pair of parallel forming edges (e.g. a V-die) with the sheet in between the knife member and the die. A feature of that invention was that the knife member was disposed so that its operative edge was off-center with respect to the mid-center line between the parallel forming edges of the lower die. The latter bending step was performed until the longitudinal edges of the work piece abut against each other, which edges were then connected by welding. Thus, a box-type quadrangular beam could be produced by means of three bending strokes and one welding operation.

2

To form a beam of uniform cross-section, the operative edge of the knife member, in the intermediate line bending step, would be non-aligned but parallel with respect to the mid-center line between the parallel forming edges of the lower die; and to form a beam of tapering cross-section, the operative edge of the knife member would be non-aligned and non-parallel with respect to the mid-center line between the parallel forming edges of the lower die.

It was found in practice, however, that there was an unduly large side thrust on the knife member because of the off-center engagement of the knife member with the work piece. This side thrust was particularly excessive in bending relatively thick sheets and plates, where slippage would occur between the knife member and the work piece. This tended to deform the knife member, and could cause even worse damage to it, or work piece, or the lower die. Therefore the method, as described above, was limited in practice to bending relatively thin sheets.

The present invention provides an improvement to the above-described method, in that it enables the method to be used for bending relatively thick sheets and plates.

According to the invention, in performing the intermediate line bending step by the off-center knife member, an excessive side thrust on the knife member, because of the off-center engagement, is avoided by holding the work piece sheet firmly against the knife edge. As a practical matter, this is accomplished by means of a yielding pressure member adapted to engage the underside of the sheet when the knife member is moved against the sheet. By using this improvement, it has been found that the method can be successfully applied to much thicker sheets and plates than heretofore.

As an example of means for holding the sheet blank against the knife edge, there may be incorporated in the lower die member a resilient pressure pad, hydraulic cushion or other member adapted to engage the underside of the blank and to hold it in close adherence with the upper member to prevent slipping and deformation.

There may be provided a rubber or similar lining in the lower die member to frictionally engage the blank.

The lower die part may comprise two parallel members which are relatively adjustable transversely of their length to provide for the spacing of their aforementioned parallel edges to be adapted to a variety of thicknesses of metal sheet.

For use in the production of a tapered beam the lower die part may also be so mounted as to be adapted to be adjusted to any small angle, within a given range, relative to the centre line of the upper die part.

The invention will be further described with reference to the accompanying diagrammatic drawings wherein:

FIGURE 5 is an enlarged view of a part of one of the portions of FIGURE 4;

FIGURE 6 represents an adjustable die;

FIGURE 7 is a general plan view of the dies during the third bending operation in the formation of a tapered rectangular beam from a sheet metal blank of the kind referred to in my U.S. Patent No. 3,039,414;

FIGURES 8 and 9 illustrate the relative arrangement of the two parts of the die at different positions along the length of the arrangement shown in FIGURE 7; and FIGURE 10 is a diagrammatic drawing illustrating the relation between the two die parts in accordance with one aspect of the invention.

Figure 1:
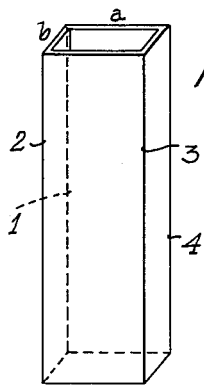
FIGURE 1 represents a box-type beam of oblong-rectangular section.
Figure 2:
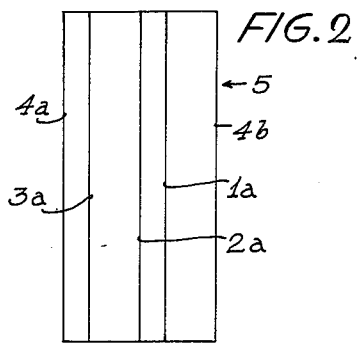
FIGURE 2 shows a sheet metal blank after marking along the lines of bending.

The invention will be first described with reference to the manufacture of a parallel beam of oblong-rectangular section, that is of a rectangular section which is other than square. As shown in FIGURE 1 the finished beam will comprise four parallel longitudinal edges 1–4 and the sectional shape will be that of a rectangle with two longer sides of dimension $a$ and two shorter sides of dimension $b$. The beam is formed from a flat rectangular steel sheet 5 shown in FIGURE 2. The longer parallel edges 4$a$ and 4$b$ of the sheet 5 will eventually be brought together to form the edge 4 of the section. On one surface of the sheet there are marked three lines 1$a$–3$a$ which are parallel to the edges 4$a$ and 4$b$ and which, in the final beam will correspond to the aforementioned edges 1–3. The lateral distance between the marks 1$a$ and 2$a$ and between the mark 3$a$ and the edge 4$a$ is equal or approximately equal to the final smaller dimension $b$. Similarly the lateral distance between the marks 3$a$ and 2$a$ and between the mark 1$a$ and edge 4$b$ is equal or approximately equal to the final larger dimension $a$.

The dies whereby the bending is effected will first be described with particular reference to FIGURES 3–6. The essential elements are a lower die member 6 and an upper die member 7. The upper die member 7 is an elongated metal plate 8, seen in end view in FIGURE 6, located in a vertical plane and having its lower edge 9 sharpened. This is mounted above a groove or slot, shown in FIGURE 5 as a V-groove 10, in the upper horizontal surface 13 of a metal block 6 or its equivalent, the mouth of the groove being bounded by two parallel edges 11 and 12. A bending operation is effected by positioning the sheet 5 on the lower die member 6 and bringing the sharpened lower edge 9 of the upper die member 7 into contact with the appropriate line marked on the upper surface of the sheet. Thereafter the upper and lower die members are forced together by appropriate mechanical, hydraulic or pneumatic means to tend to force the sheet into the groove. As is clearly indicated in FIGURE 5 the effect of the engagement of the underside of the sheet by the two parallel edges 11 and 12 on the lower die member and of the upper side of the sheet by the sharpened edge 9 of the upper die member at a position between the edges 11 and 12 will cause the sheet to be bent along the mark in its surface at a sharp angle. The pressing movement will continue until that angle is substantially a right angle. It will be understood that in the making of a parallel beam the lower edge 9 of the upper die member 7 will be parallel to the edges 11 and 12 of the lower die member 6.

Figure 3:
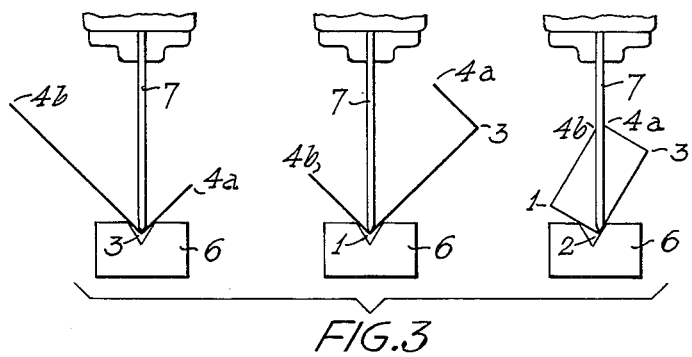
FIGURE 3 illustrates three bending operations in one method of forming the beam.
Figure 4:
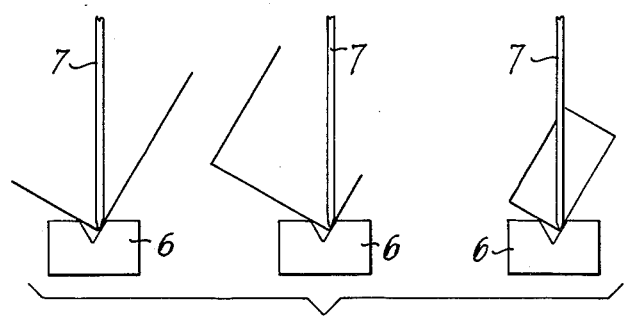
FIGURE 4 illustrates three bending operations in another method.

Referring now to FIGURES 3 and 4 the sheet is subjected to three bending operations. In the first operation the bend is effected along the mark 3$a$ (of FIG. 2). In the second operation the bending is effected along the mark 1$a$, the edge 3 of the beam having been made by the first operation. In the third operation the bending is effected along the central mark 2$a$, the edges 1 and 3 having already been formed, and this third operation serves to bring together the aforementioned edges 4$a$ and 4$b$ as indicated in the extreme right hand part of FIGURE 3. The blade 7 is then raised or moved longitudinally out of engagement with the work piece so that the edges 4$a$ and 4$b$, previously separated by the blade, will move together or almost together, due to the inherent springiness of the work piece. The last edge 4 of the beam is then completed by welding these adjacent edges 4$a$ and 4$b$.

It is desirable to ensure that in the final bending operation along the line 2$a$, the two edges 4$a$ and 4$b$ of the sheet will tend to come together along a line which is within the plane of the blade-like upper die member 7, that is to say that at the end of the final bending operation the blade-like member will lie on or approximately on the diagonal of the rectangular section.

FIGURE 10 represents very diagrammatically the relation between the central plane of the blade 7, the rectangular section and the parallel edges 11 and 12 of the lower die member at the completion of the final bending on the mark 2$a$, the blade being substantially on a diagonal. A line joining the edges 11 and 12 intersects the plane of the blade 7 at right angles and is shown divided thereby into two parts of dimensions $x$ and $y$. It can be shown that the relation $x:y$ corresponds to the $a^2:b^2$. If, therefore, in the performance of the final bending operation, the centre line or plane of the blade 7 is located parallel to the edges 11 and 12 of the lower die member, but is also offset so as to divide the distance between those edges in the proportion $a^2:b^2$, the above mentioned desirable condition will be obtained. This is the situation represented in the extreme right-hand sections of both FIGURES 3 and 4.

In the formation of the two outer bends on the marks 1$a$ and 3$a$ a particular relative arrangement of the die parts is not necessary and the blade 7 can be arranged centrally between the edges 11 and 12 of the lower die part 6 as indicated in the central and left-hand parts of FIGURE 3. On the other hand, if during the first and second bending operations the position of the blade 7 relative to the parallel edges 11 and 12 of the lower die part is that which is desirable for the third bending operation, this will not undesirably affect the first and second bending operations. This condition is represented in FIGURE 4, where the relative positions of the two die parts is the same for each of the three bending operations.

FIGURE 5 illustrates on a larger scale the above discussed adjustment of the position of the blade. The broken line 14 represents the plane of the blade 7 midway between the lower die edges 11 and 12, corresponding to the first and second bending operations illustrated in FIGURE 3. The blade 7 is shown with its central plane offset to the line 15 for the final bending operation, the completion of which is also indicated in FIGURE 5.

It will be appreciated that each bending operation proceeds until the angle of the bend is 90°. As indicated in FIGURE 5 the dimensions of the V-groove 10 may be so selected that the termination of the bending operation is determined when one part of the metal sheet extending away from the angle lies in full contact with one face of the V-groove, or alternatively in full contact with one oblique face of the blade member's edge portion or a combination of both.

Where the bending operation is effected with the blade centrally between the edges 11 and 12 of the lower die member, the V-groove could have a 90° angle.

It will be apparent that the working parts of the lower die member are essentially the parallel edges 11 and 12. Consequently it is not necessary for them to be the outer edges of a V-groove. The groove may for instance be of U-section or may be an open slot.

Also in accordance with the invention the lower die member may comprise two bars 17 and 18 shown in FIGURE 6 as having a square section and mounted side-by-side on a shallow U-section base 19. The lower limb 20 of the base 19 serves as a slide bed support for the bars. Adjusting screws 21 and 22 extend through the upstanding side members 23 and 24 of the base 19 and their inner ends engage the outsides of the bars. The upper inner edges of the bars 17 and 18 constitute the aforementioned edges 11 and 12 of the lower die member. The distance apart of these edges can be adjusted by means of the screws 21 and 22 which are provided with appropriate locking nuts 25.

Between the die bars 17 and 18 there is located a member 26 in the form of a rubber pad, spring pressure pad or hydraulic pressure pad. This is intended to frictionally engage the underside of the sheet metal work piece 5 in the position of its engagement by the blade-like upper die member 7. This frictional engagement serves to assist in preventing an excessively large side thrust on the knife member caused by the displacement of the work piece as there is a tendency for such displacement to occur as the result of the off-center disposition of the knife member and the unequal loading of the edges 11 and 12 of the lower die. At the same time the member 26 is deformable or movable under pressure so that it will not prevent the downward movement of the work piece under the upper die member during the bending operation.

In practice the above mentioned hydraulic pressure pad will mostly be employed. It comprises a row of hydraulic jacks 26 each of which consists of a cylinder with a piston, the latter presenting its upper face for placing thereon the sheet 5. Under pressure of the downwardly moving member 7 the pistons of jacks 26 yield but still offer sufficient resistance to prevent a slipping of the sheet.

The lower edge of the blade 7 may also be toothed, knurled, roughened or otherwise adapted to make frictional engagement with the top surface of the work piece.

FIGURES 7–9 are intended to represent the final bending operation in the formation of a tapered rectangular section beam of the kind described in my earlier patent. In this operation, due to the change of the ratio $a/b$ of the dimensions of the section along the length of the beam, the aforementioned condition whereby the blade member is required to be on the diagonal of the section at the end of the final bending operation will not be achieved if the centre line thereof is parallel with, although offset from, the edges 11 and 12 of the lower die member. It is therefore proposed to set the blade at a small angle to those edges. That small angle could be set by adjusting the blade member itself. It is however, more convenient to adjust the lower die member.

In FIGS. 8 and 9, the lower die member is shown as a block 111 with a V-groove 114. It is mounted in an inverted shallow U-section base 113. The upper blade-like die member is shown at 110 which reference also indicates in FIGURE 7 the centre line or plane of the blade. FIGURE 8 represents the condition at one end where the section of the beam is square. Here the plate 110 is central with reference to the edges of the groove 114, the block 111 being held centrally in its base 113 by means of spacer members 112 located between each side of the block 111 and upstanding side of the base 113. At the other end of the beam the section is rectangular with sides of unequal dimensions and here, as indicated in FIGURE 9, the centre line of the blade 110 is off centre by an amount determined by the aforementioned relation between the dimensions of the rectangle in this position.

In the case illustrated this displacement is determined by placing both spacer members 112 on the same side of the lower die block 111. The straight blade 110 will thus be approximately positioned with reference to the edges of the lower die member at all positions along its length, as indicated in FIGURE 7.

It will be appreciated that the form of die previously described with reference to FIGURE 6 is particularly suitable for adjustment to meet the requirements of the process described with reference to FIGURES 7–9.

Another method of determining the extent of the displacement of the centre line or plane of the blade with respect to the edges of the lower die involves consideration of the relation between complementary angles between the blade and the adjacent parts of the work piece at the end of a bending operation. In the blade is to lie on a diagonal of the section, these angles will be such that their tangents are $a/b$ and $b/a$ respectively. The angles being thus determinable from the dimensions of the section the bending operation can be checked by actually measuring those angles, by means of appropriately shaped gauges.

The underlying idea of the invention is the manufacture of hollow beams as set out above. However it would be within the scope of the invention to mark four bending lines on the blank and instead of the preferred method of making three bends and locating the fourth corner of the beam in the line of the two outer edges of the blank which eventually are joined together, to locate the said joint intermediate two corners. The same or a like situation arises in the manufacture of beams of polygonal cross-section, i.e. having five or six sides.

What I claim is:

1. A method of manufacturing a hollow box-type section beam from a flat elongated sheet work piece, comprising: bending the sheet about one outer line; bending the sheet about at least one other outer line spaced therefrom; bending the sheet about an intermediate line; at least the last-mentioned bending step being performed by moving a knife member toward a die having a pair of parallel forming edges with the sheet in between the knife member and the die, the operative edge of the knife member being off-center with respect to the mid-center line between said parallel forming edges, and avoiding excessive side thrusts on the knife member because of said off-center engagement thereof by holding said sheet firmly against said knife edge; and joining together the free edges of the sheet.

2. A method as defined in claim 1, wherein said step of holding said sheet firmly against said knife edge is accomplished by means of a yielding pressure member adapted to engage the under side of the sheet when said knife member is moved against said sheet.

3. The method as defined in claim 1, wherein in the intermediate line bending step, the operative edge of the knife member is non-aligned but parallel with respect to the mid-center line between the parallel forming edges of the lower die, thereby producing a beam of uniform cross-section.

4. The method as defined in claim 1, wherein in the intermediate line bending step, the operative edge of the knife member is non-aligned and non-parallel with respect to the mid-center line between the parallel forming edges of the lower die, thereby producing a beam of tapering cross-section.

References Cited by the Examiner
UNITED STATES PATENTS

| | | | |
|---|---|---|---|
| 381,175 | 4/1888 | Schoen | 153—21 |
| 2,893,459 | 7/1959 | Kosek | 153—21 |
| 3,039,414 | 6/1962 | Rosanes | 153—21 |

CHARLES W. LANHAM, *Primary Examiner.*

WILLIAM J. STEPHENSON, *Examiner.*